(12) United States Patent
Thomas

(10) Patent No.: US 10,682,974 B2
(45) Date of Patent: Jun. 16, 2020

(54) NESTED OVERHEAD AIRBAG SYSTEM

(71) Applicant: GM Global Technology Operations LLC, Detroit, MI (US)

(72) Inventor: Scott D. Thomas, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 40 days.

(21) Appl. No.: 15/825,921

(22) Filed: Nov. 29, 2017

(65) Prior Publication Data

US 2019/0161046 A1    May 30, 2019

(51) Int. Cl.
| | | |
|---|---|---|
| B60R 21/213 | (2011.01) | |
| B60R 21/232 | (2011.01) | |
| B60R 21/231 | (2011.01) | |
| B60R 21/2338 | (2011.01) | |
| B60R 21/233 | (2006.01) | |
| B60R 21/262 | (2011.01) | |
| B60R 21/214 | (2011.01) | |

(52) U.S. Cl.
CPC .......... *B60R 21/213* (2013.01); *B60R 21/214* (2013.01); *B60R 21/232* (2013.01); *B60R 21/233* (2013.01); *B60R 21/2338* (2013.01); *B60R 21/23138* (2013.01); *B60R 21/262* (2013.01); *B60R 2021/23107* (2013.01); *B60R 2021/23386* (2013.01)

(58) Field of Classification Search
CPC ... B60R 21/213; B60R 21/214; B60R 21/262; B60R 21/233; B60R 21/23138; B60R 21/232; B60R 21/2338; B60R 2021/23107; B60R 2021/23386
See application file for complete search history.

(56) References Cited

U.S. PATENT DOCUMENTS

| | | |
|---|---|---|
| 3,866,940 A | 2/1975 | Lewis |
| 3,888,503 A | 6/1975 | Hamilton |
| 5,312,131 A | 5/1994 | Kitagawa et al. |
| 5,470,103 A | 11/1995 | Vaillancourt et al. |
| 5,472,228 A | 12/1995 | Bentley et al. |
| 5,480,181 A | 1/1996 | Bark et al. |

(Continued)

OTHER PUBLICATIONS

U.S. Appl. No. 15/599,123, filed May 10, 2017, Mihm, US 2018/0334130 (Nov. 22, 2018).

(Continued)

*Primary Examiner* — Frank B Vanaman

(57) ABSTRACT

An overhead airbag system includes a first airbag assembly with a first inflator and a first airbag cushion. The first airbag cushion includes an occupant-facing portion, a first side portion and a second side portion. The occupant-facing portion is connected between the first side portion and the second side portion and separates the first side portion from the second side portion by a first gap. The first airbag cushion is operable in an uninflated state and an inflated state. The airbag system also includes a second airbag assembly with a second inflator and a second airbag cushion. The second airbag cushion includes an occupant-facing wall and at least one side wall. The occupant-facing wall faces away from the occupant-facing portion of the first airbag cushion and the at least one side wall is positioned between the first side portion and the second side portion of the first airbag cushion.

10 Claims, 10 Drawing Sheets

(56) References Cited

U.S. PATENT DOCUMENTS

| | | | |
|---|---|---|---|
| 5,564,734 A | 10/1996 | Stuckle | |
| 5,602,734 A | 2/1997 | Kithil | |
| 5,730,464 A | 3/1998 | Hill | |
| 5,797,620 A | 8/1998 | Eyrainer | |
| 6,065,798 A * | 5/2000 | Sankrithi | B60P 3/423 296/181.1 |
| 6,070,902 A * | 6/2000 | Kowalski | B60R 13/0225 280/730.2 |
| 6,113,132 A * | 9/2000 | Saslecov | B60R 21/20 280/730.1 |
| 6,176,515 B1 | 1/2001 | Wallner et al. | |
| 6,217,059 B1 | 4/2001 | Brown et al. | |
| 6,336,653 B1 | 1/2002 | Yaniv et al. | |
| 6,722,691 B1 | 4/2004 | Hangland et al. | |
| 7,195,276 B2 | 3/2007 | Higuchi | |
| 7,762,579 B2 | 7/2010 | Garner | |
| 8,157,291 B2 | 4/2012 | Mayer et al. | |
| 8,414,017 B2 * | 4/2013 | Lee | B60R 21/231 280/730.1 |
| 8,579,321 B2 * | 11/2013 | Lee | B60R 21/214 280/729 |
| 8,894,095 B1 | 11/2014 | Meister et al. | |
| 9,321,423 B2 | 4/2016 | Jaradi et al. | |
| 9,327,669 B2 | 5/2016 | Jaradi et al. | |
| 9,428,135 B1 | 8/2016 | Thomas et al. | |
| 9,446,731 B1 | 9/2016 | West et al. | |
| 9,446,735 B1 | 9/2016 | Jayasuriya et al. | |
| 9,457,642 B2 * | 10/2016 | Kothari | B60R 1/00 |
| 9,610,915 B2 | 4/2017 | Specht et al. | |
| 9,663,058 B1 | 5/2017 | Whitens et al. | |
| 2002/0024204 A1 | 2/2002 | Fischer | |
| 2002/0053785 A1 | 5/2002 | Pausch et al. | |
| 2002/0056974 A1 | 5/2002 | Webert | |
| 2003/0192731 A1 | 10/2003 | Kikuchi et al. | |
| 2005/0023811 A1 | 2/2005 | Thomas | |
| 2006/0202451 A1 | 9/2006 | Nakanishi | |
| 2007/0045999 A1 | 3/2007 | Saberan et al. | |
| 2009/0295135 A1 | 12/2009 | Kumagai et al. | |
| 2010/0301591 A1 | 12/2010 | Kwon et al. | |
| 2011/0101652 A1 | 5/2011 | Abe | |
| 2012/0074677 A1 | 3/2012 | Hiruta et al. | |
| 2012/0133114 A1 | 5/2012 | Choi et al. | |
| 2012/0140126 A1 * | 6/2012 | Werth | B60R 11/0235 348/837 |
| 2012/0280476 A1 | 11/2012 | Ory | |
| 2012/0292894 A1 | 11/2012 | Kobayashi et al. | |
| 2014/0197622 A1 | 7/2014 | Muraji et al. | |
| 2014/0265281 A1 | 9/2014 | Witt, Jr. et al. | |
| 2014/0291970 A1 | 10/2014 | Ory | |
| 2015/0061268 A1 | 3/2015 | Nagasawa | |
| 2015/0166185 A1 | 6/2015 | Oleson et al. | |
| 2015/0203066 A1 | 7/2015 | Pausch et al. | |
| 2016/0052636 A1 | 2/2016 | Moeller et al. | |
| 2017/0113646 A1 | 4/2017 | Lee et al. | |
| 2017/0144622 A1 * | 5/2017 | Perlo | B60R 21/23138 |
| 2017/0158158 A1 | 6/2017 | Thomas | |
| 2017/0190311 A1 | 7/2017 | Schneider | |
| 2017/0282838 A1 | 10/2017 | Jung et al. | |
| 2018/0043852 A1 | 2/2018 | Fischer et al. | |
| 2018/0222432 A1 * | 8/2018 | Schneider | B60R 21/214 |
| 2018/0229681 A1 | 8/2018 | Jaradi et al. | |
| 2019/0001795 A1 | 1/2019 | Muldrow | |
| 2019/0106073 A1 | 4/2019 | Sundararajan et al. | |

OTHER PUBLICATIONS

U.S. Appl. No. 15/874,468, filed Oct. 16, 2017, Thomas, US 2019/0111883 (Apr. 18, 2019).

U.S. Appl. No. 15/825,665, filed Nov. 29, 2017, Thomas et al., US 2019/0161048 (May 20, 2019).

U.S. Appl. No. 15/825,800, filed Nov. 29, 2017, Thomas et al., US 2019/0161045 (May 30, 2019).

* cited by examiner

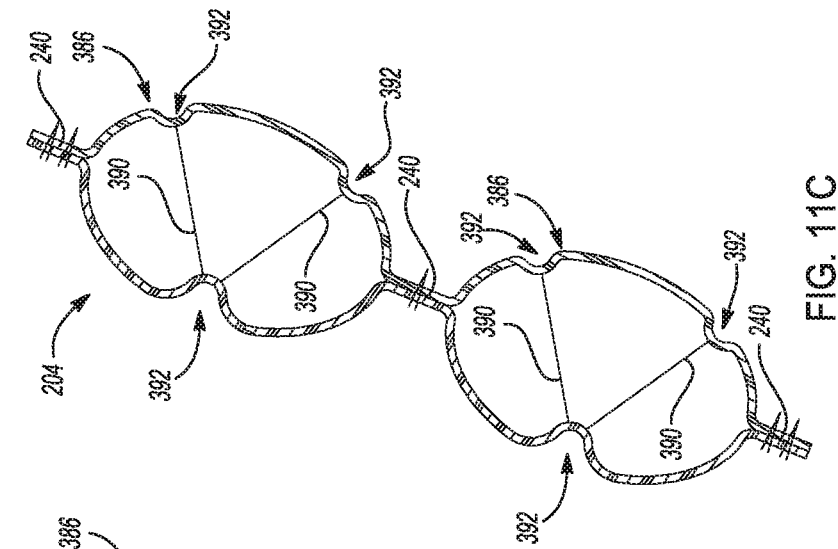
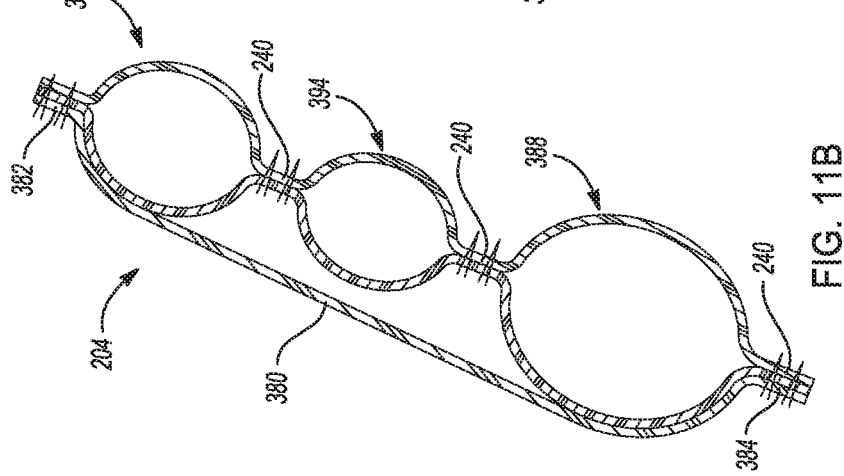
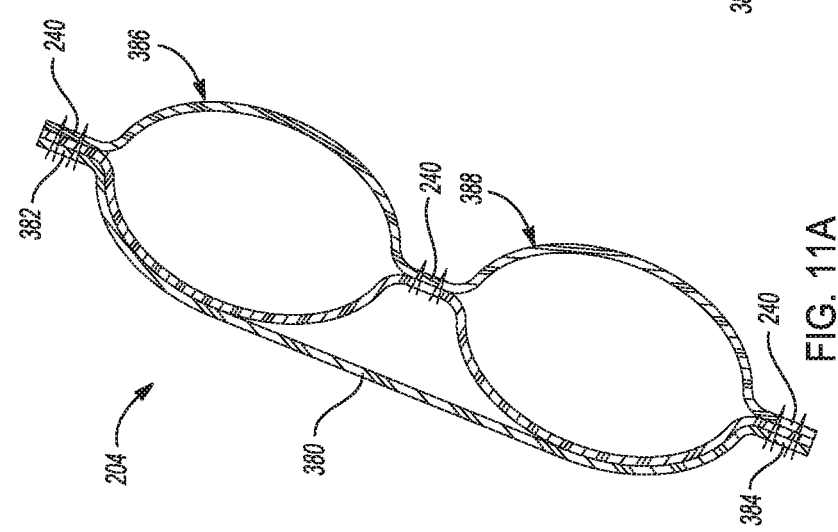

NESTED OVERHEAD AIRBAG SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a nested overhead airbag system. More particularly the present disclosure relates to a nested overhead airbag system that includes one or more airbag assemblies for use in vehicles with overhead-mounted structures and airbags.

Airbag assemblies typically include an airbag cushion and an inflator that is operable to inflate the airbag cushion. The inflator includes a tube having a closed end containing a gas source and an open end opposite the closed end and positioned within the airbag cushion. The gas source typically includes an electric igniter and at least one of an explosive charge such as solid propellant and a stored gas charge stored under high pressure. The electric igniter ignites the solid propellant and/or releases the stored gas in response to an electric control signal, which produces a gas that inflates the airbag cushion.

Airbag assemblies are typically mounted in a dashboard of a vehicle, in a seat of a vehicle, and/or in a steering wheel of a vehicle. However, some airbag assemblies are mounted to a roof of a vehicle and deploy in a downward direction from the vehicle roof. Such airbag assemblies are commonly referred to as roof-mounted or overhead airbag systems.

SUMMARY

In one example in accordance with the present disclosure, an overhead airbag system includes a first airbag assembly with a first inflator and a first airbag cushion. The first airbag cushion includes an occupant-facing portion, a first side portion and a second side portion. The occupant-facing portion is connected between the first side portion and the second side portion and separates the first side portion from the second side portion by a first gap. The first airbag cushion is fluidly connected to the first inflator and is operable in an uninflated state and an inflated state. The airbag system also includes a second airbag assembly with a second inflator and a second airbag cushion. The second airbag cushion includes an occupant-facing wall and at least one side wall. The occupant-facing wall faces away from the occupant-facing portion of the first airbag cushion and the at least one side wall positioned between the first side portion and the second side portion of the first airbag cushion.

In one aspect, the second airbag cushion includes a first side wall and a second side wall. The occupant-facing wall is positioned between the first side wall and the second side wall and separates the first side wall from the second side wall by a second gap. The second airbag cushion is fluidly connected to the second inflator and is operable in an uninflated state and an inflated state.

In one aspect, the first side wall is positioned adjacent to the first side portion. The second side wall is positioned adjacent to the second side portion and between the first side portion and the second side portion.

In one aspect, the overhead airbag system is configured for use in a vehicle with a roof-mounted structure wherein at least a portion of the first gap and at least a portion of the second gap overlap such that the roof-mounted structure is located between the first side wall and the second side wall when the second airbag cushion is in the inflated state.

In one aspect, the first airbag cushion and the second airbag cushion can be inflated from the uninflated state to the inflated state independently of each other.

In one aspect, the overhead airbag system is configured for use in a vehicle wherein the first side portion and the second side portion project away from the occupant-facing portion along a roof of the vehicle. The first side portion and the second side portion are configured to support the occupant-facing portion and limit movement of the occupant-facing portion in a direction away from an occupant of the vehicle when the occupant engages the first airbag cushion.

In one aspect, the first airbag cushion and the second airbag cushion are configured to inflate from uninflated states to inflated states independently without interfering with the roof-mounted structure.

In one aspect, the roof-mounted structure is a roof-mounted display screen.

In one aspect, the overhead airbag system is configured for use in a vehicle wherein the occupant-facing portion of the first airbag cushion includes a lower region and an upper region. The lower region is positioned closer to an occupant of the vehicle than the upper region.

In one aspect, the first airbag cushion further includes a middle portion and a second occupant-facing portion. The middle portion is connected to the occupant-facing portion and is disposed between the first side portion and the second side portion.

In one aspect, the overhead airbag system includes a rigid fill tube in fluid communication with the occupant-facing portion, the first side portion and the second side portion. The rigid fill tube is connected to the first inflator and is configured to distribute gas from the inflator to the occupant-facing portion, the first side portion and the second side portion to inflate the first airbag cushion from the uninflated state to the inflated state.

In one aspect, the first side portion includes a horizontal edge. The horizontal edge is configured to be connected at a roof of the vehicle by a plurality of tabs projecting therefrom.

In one aspect, the occupant-facing portion of the first airbag cushion is disposed opposite to the occupant-facing portion of the second airbag cushion and the occupant-facing portions of the first airbag cushion and the second airbag cushion are configured to inflate in directions away from each other and toward occupants that are facing toward each other.

In one aspect, the occupant-facing portion includes a flexing portion and a lower region. The flexing portion is positioned above the lower region and is configured to move a greater distance away from an occupant than the lower region when the occupant engages the first airbag cushion.

In one aspect, the first side portion includes a plurality of seams disposed in an upward diagonal direction from the occupant-facing portion toward a distal end of the first side portion. The plurality of seams configured to stiffen the first side portion to support the occupant-facing portion and limit movement thereof when an occupant engages the first airbag cushion.

In one aspect, the first airbag assembly includes a second occupant-facing portion disposed laterally adjacent to the occupant-facing portion. The occupant-facing portion is configured to be located in front of a first occupant in a vehicle and the second occupant-facing portion is configured to be located in front of a second occupant in the vehicle. The first occupant is seated adjacent to the second occupant.

In another example in accordance with the present disclosure, an overhead airbag system is for use in a vehicle with a roof-mounted structure. The example airbag system includes a first airbag assembly including a first inflator and a first airbag cushion. The first airbag cushion includes an occupant-facing portion, a first side portion and a second side portion. The occupant-facing portion is connected between the first side portion and the second side portion and separates the first side portion from the second side portion by a first gap. The first airbag cushion is fluidly connected to the first inflator and is operable in an uninflated state and an inflated state, wherein the first airbag cushion inflates from the uninflated state to the inflated state such that the roof-mounted structure is positioned in the first gap when the first airbag cushion is in the inflated state.

In one aspect, the first side portion and the second side portion project away from the occupant-facing portion along a roof of the vehicle. The first side portion and the second side portion are configured to support the occupant-facing portion and limit movement of the occupant-facing portion in a direction away from an occupant of the vehicle when the occupant engages the first airbag cushion.

In one aspect, the occupant-facing portion includes a flexing portion and a lower region. The flexing portion is positioned above the lower region and is configured to be more flexible than the lower region when the occupant engages the first airbag cushion.

In another example in accordance with the present disclosure, an example overhead airbag system is configured for use in a vehicle with a first roof-mounted display screen facing a first occupant and with a second roof-mounted display screen facing a second occupant. The example airbag system includes a first airbag assembly including a first inflator, a first rigid fill tube and a first airbag cushion. The first inflator is fluidly connected to the first rigid fill tube. The first airbag cushion is fluidly connected to the first rigid fill tube and is configured to inflate from a stowed uninflated state to a deployed inflated state. The first airbag cushion includes an occupant-facing portion positioned opposite to and facing the first occupant. The first airbag cushion further includes a first side portion and a second side portion connected to opposite sides of the occupant-facing portion and projecting away therefrom in a direction away from the first occupant. The first side portion is spaced apart from the second side portion by the occupant-facing portion. The occupant-facing portion is positioned between the first occupant and the first roof-mounted display screen, and the first side portion and the second side portion are positioned on opposite sides of the first roof-mounted display screen.

The example overhead airbag system further includes a second airbag assembly including a second inflator, a second rigid fill tube and a second airbag cushion. The second inflator is fluidly connected to the second rigid fill tube. The second airbag cushion is fluidly connected to the second rigid fill tube and is configured to inflate from a stowed uninflated state to a deployed inflated state. The second airbag cushion includes an occupant-facing wall positioned opposite to and facing the second occupant. The second airbag cushion further includes a first side wall and a second side wall connected to opposite sides of the occupant-facing wall and projecting away therefrom in a direction away from the second occupant. The first side wall is spaced apart from the second side wall by the occupant-facing wall. The occupant-facing wall is positioned between the second occupant and the second roof-mounted display screen, and the first side wall and the second side wall are positioned on opposite sides of the second roof-mounted display screen, wherein at least one of the first side wall and the second side wall is positioned between the first side portion and the second side portion so that a portion of the second airbag cushion is nested inside the first airbag cushion.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 11A, 11B, and 11C are cross-sectional views of example occupant-facing portions of the airbag cushion of FIG. 7.

In the drawings, reference numbers may be reused to identify similar and/or identical elements.

DETAILED DESCRIPTION

Existing airbag assemblies are often mounted in dashboards, in seats or in steering wheel of vehicles. In such circumstances, the airbag cushions inflate toward an occupant of the vehicle from the dashboard, seat or steering wheel. Since the airbag cushions inflate outward from a surface positioned in front of the occupant, there are typically no vehicle structures positioned between the airbag and the occupant that can interfere with the inflation of the airbag cushion or prevent the intended operation of the airbag cushion.

In some environments, an airbag assembly is mounted to a roof of a vehicle in an overhead position. The airbag cushions that inflate from such overhead airbag assemblies project downward from a position above an occupant. Various vehicle structures are often mounted to a roof of a vehicle that can interfere with the operation of the overhead airbag assemblies. Such vehicle structures can include, for example, display screens, storage bins, consoles, occupant control panels, touchscreens and the like. These may be mounted to the roof and can be called roof mounted structures. In addition, adjacent airbags can interfere with the operation of the overhead airbag assemblies.

Vehicles often include seating arrangements in which multiple occupants are positioned next to each other and can be facing each other. The airbag systems and assemblies according to the present disclosure include airbag cushions that nest with one another such that the airbag cushions do not interfere with other vehicle structures or with one another. The airbag cushions of the present disclosure also include one or more side walls that project along the roof of the vehicle to support the airbag cushion and to limit movement of the airbag cushion in a direction away from the occupant.

Figure 1:
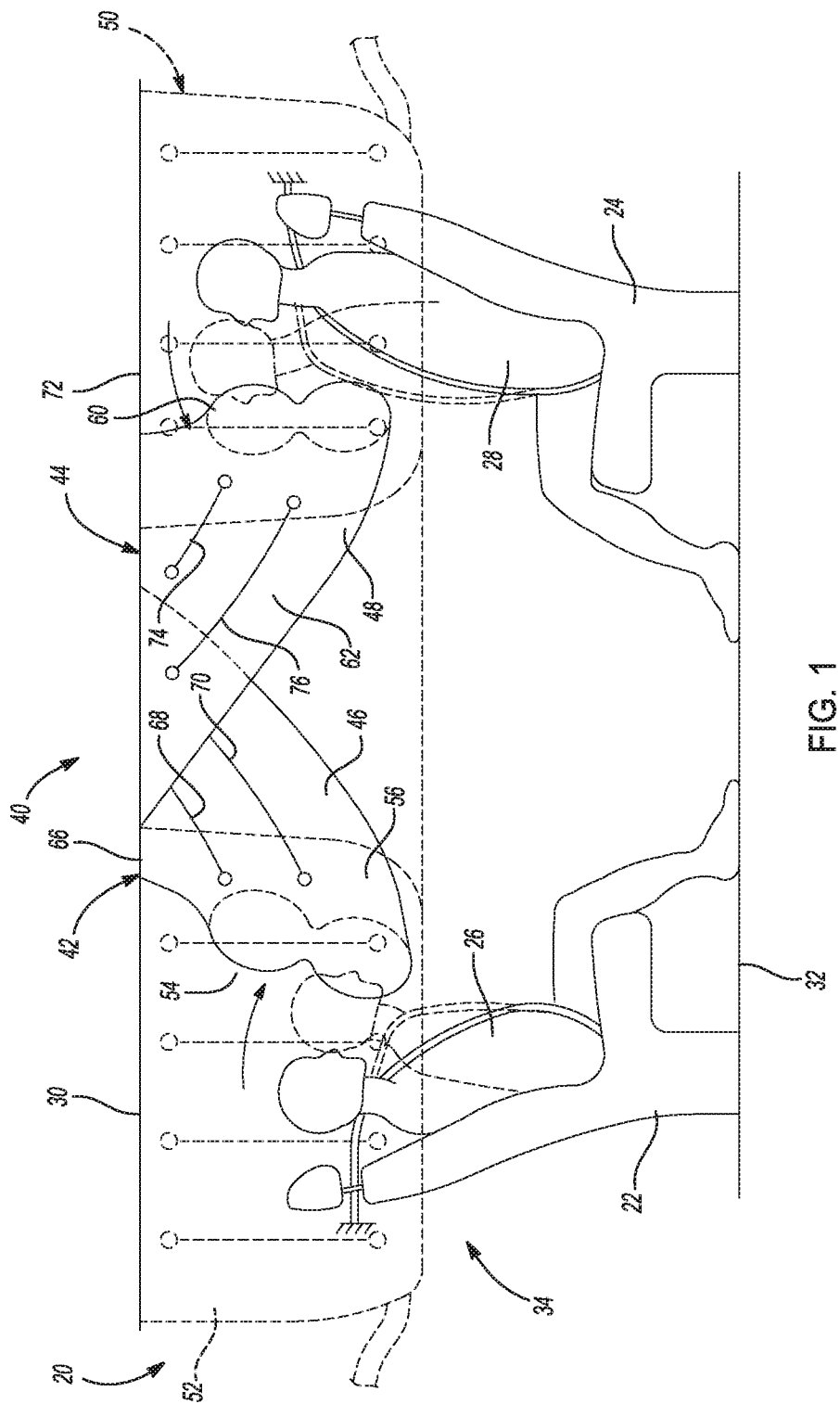
FIG. 1 is an illustration of an example airbag system in a vehicle in accordance with the present disclosure.

Referring now to FIG. 1, a vehicle 20 includes a first seat 22, a second seat 24, a first occupant 26 and a second occupant 28. The vehicle 20 further includes a roof 30 and a floor 32 that define a vehicle cabin 34. In the example vehicle 20 shown, the first seat 22 and the second seat 24 are arranged in a manner so that the first occupant 26 and the second occupant 28 are facing one another. The example airbag systems described below are described in the context of this arrangement. The described airbag systems, however, can be used in other vehicle arrangements and in other environments as well.

As shown, an example airbag system 40 includes a first airbag assembly 42 and a second airbag assembly 44. The first airbag assembly 42 and the second airbag assembly 44 are mounted to the roof 30 such that a first airbag cushion 46 projects downward from the roof 30 toward the first occupant 26 and a second airbag cushion 48 projects downward from the roof 30 toward the second occupant 28. Since the first occupant 26 and the second occupant 28 are facing one another, in this example, the first airbag cushion 46 and the second airbag cushion 48 project away from one another.

The airbag system 40 in this example may also include a roof rail airbag assembly 50. The roof rail airbag assembly 50, in this example, includes a separate roof rail airbag cushion 52. The roof rail airbag cushion 52 extends along a side of the vehicle 20. The roof rail airbag cushion 52 is positioned laterally outboard from the first occupant 26, the second occupant 28, the first airbag assembly 42 and the second airbag assembly 44. The airbag system 40 can include a second roof rail airbag cushion (not shown in FIG. 1) that is positioned on an opposite side of the vehicle 20.

Figure 3:
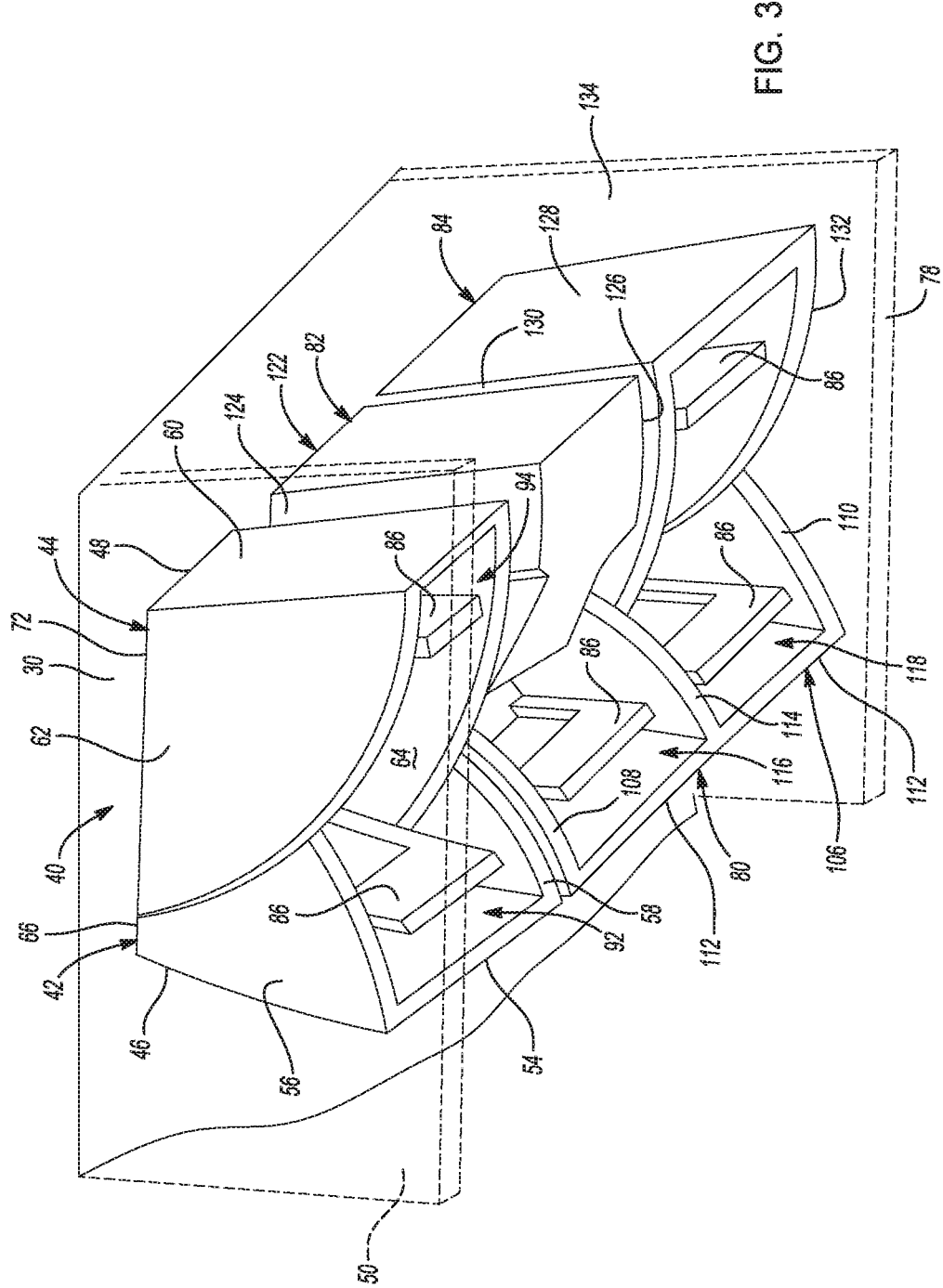
FIG. 3 is a view of the example airbag system of FIG. 2 shown in a deployed, inflated state.

As will be further described below, the first airbag cushion 46 and the second airbag cushion 48 are operable in a stowed, uninflated state in the roof 30. The first airbag cushion 46 and the second airbag cushion 48 also operate in a deployed, inflated state as shown in FIG. 1. As shown in FIGS. 1 and 3, the first airbag cushion 46 includes an occupant-facing portion 54, a first side portion 56 and a second side portion 58. The occupant-facing portion 54 is positioned in front of the first occupant 26 and may be angled so that the portion near the bottom is closer to the occupant than the portion at the top. The first side portion 56 and the second side portion 58 project away from the first occupant 26. An upper edge 66 of the first side portion 56 is connected at the roof 30. With this configuration, the first side portion 56 (and the second side portion 58) limits movement of the occupant-facing portion 54 in a direction away from the first occupant 26 when the first occupant 26 engages the occupant-facing portion 54. The first side portion 56 and the second side portion 58 provide structural support for the lateral ends of the occupant-facing portion 54.

The first airbag cushion 46, in this example, also includes an upper tether 68 and a lower tether 70. In this example, the upper tether 68 and the lower tether 70 connect inboard and outboard panels of the first side portion 56. In other examples, the inboard and outboard panels touch one another at the upper tether 68 and/or the lower tether 70. Such an interface at the upper tether 68 and/or the lower tether 70 is referred to as a zero length tether. The upper tether 68 and the lower tether 70 are angled seams of stitches that connect two opposing panels of the first side portion 56. The upper tether 68 and the lower tether 70 create chambers inside the first side portion 56. The upper tether 68 and the lower tether 70 stiffen the first side portion 56 and provide further support in the first airbag cushion 46 to assist in limiting the movement of the occupant-facing portion 54. In other examples of the first airbag cushion 46, the upper tether 68 and the lower tether 70 can be pieces of flexible fabric sewn, woven or otherwise connected in the first side portion 56 to provide the support and/or stiffness previously described. The upper tether 68 and/or the lower tether 70 can also be formed in a zero length tether configuration by weaving the upper tether 68 and/or the lower tether 70 into position. In still other examples, the first side portion 56 can include more than or less than two tethers.

As further shown in FIGS. 1 and 3, the second airbag cushion 48 has a configuration similar to that previously described with respect to the first airbag cushion 46. The second airbag cushion 48, however, is configured symmetrically opposite to the first airbag cushion 46 about a center of the vehicle cabin 34. The second airbag cushion 48, in this example, includes an occupant-facing wall 60, a first side wall 62 and a second side wall 64. The occupant-facing wall 60 is positioned in front of the second occupant 28. In the example shown, the occupant-facing wall 60 is positioned vertically so that the portion near the bottom is the same distance from the second occupant 28 as the portion at the top. In other examples, the occupant-facing wall 60 can be angled in the manner previously described with respect to occupant-facing portion 54. In the example shown, an upper edge 72 of the first side wall 62 is connected at the roof 30. With this configuration, the first side wall 62 (and the second side wall 64) limits movement of the occupant-facing wall 60 in a direction away from the second occupant 28 when the second occupant engages the occupant-facing wall 60. The first side wall 62 and the second side wall 64 provide structural support for the lateral ends of the occupant-facing wall 60.

The second airbag cushion 48, in this example, includes an upper tether 74 and a lower tether 76 that are positioned on the first side wall 62 and extend diagonally and upwardly away from the occupant-facing wall 60. The upper tether 74 and the lower tether 76, in this example, are seams of stitches that connect the opposing panels of the first side wall 62 in a zero length tether configuration. In other examples, the upper tether 74 and the lower tether 76 can have other configurations and/or otherwise connect and/or stiffen the first side wall 62 as previously described.

Figure 2:
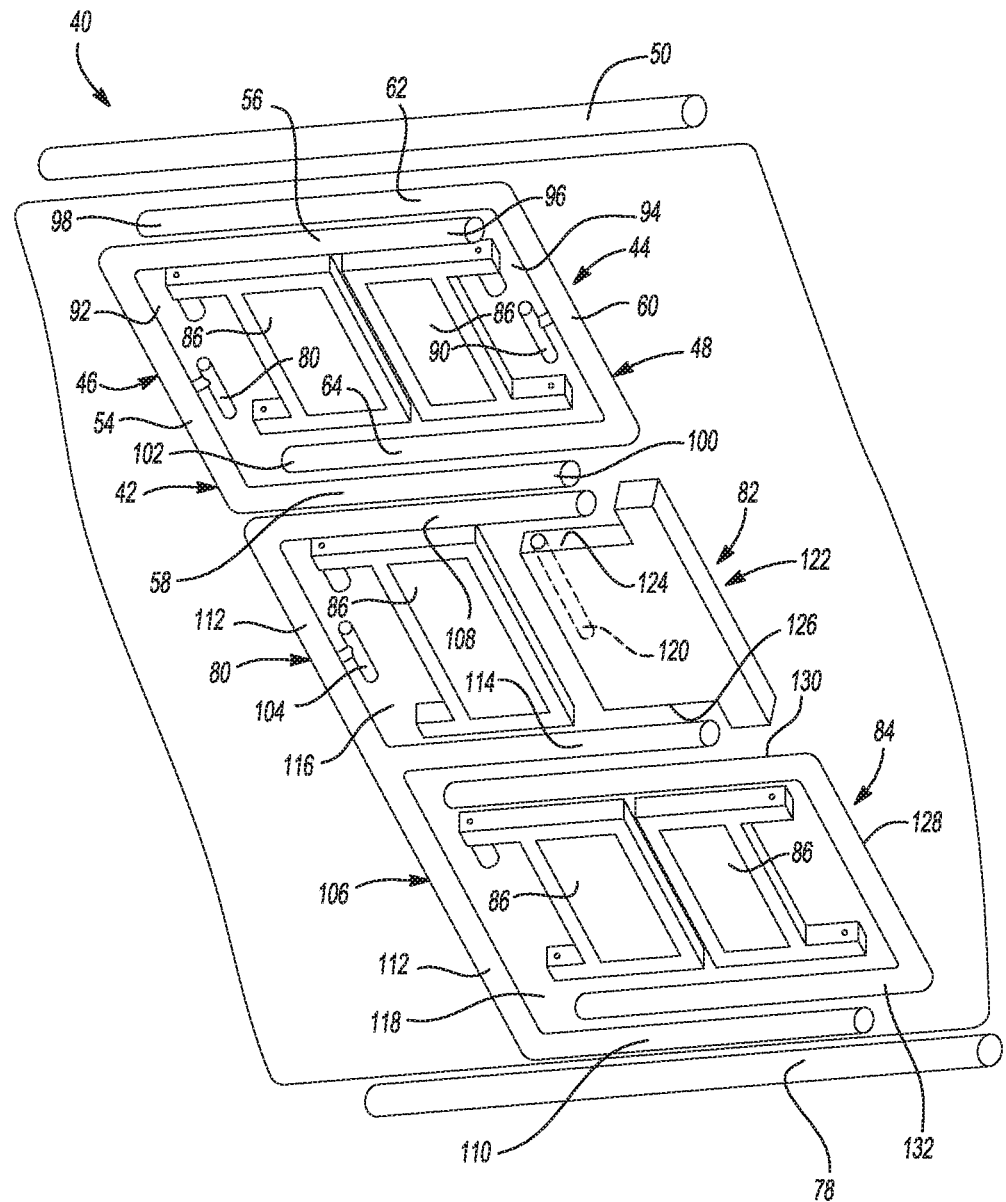
FIG. 2 is another view of the example airbag system of FIG. 1 shown in a stowed, uninflated state.

Referring now to FIGS. 2 and 3, the example airbag system 40 is shown in the stowed, uninflated state (FIG. 2) and in the deployed, inflated state (FIG. 3). As shown in FIG. 3, the example airbag system 40 is mounted to the roof 30. The airbag system 40 extends laterally in the vehicle 20 between a first roof rail airbag assembly 50 and a second roof rail airbag assembly 78. The airbag system 40 includes the first airbag assembly 42, the second airbag assembly 44, a double-occupant airbag assembly 80, a continuous airbag assembly 82 and a third airbag assembly 84. As can be seen, the vehicle 20 includes one or more display screens 86 that are mounted to the roof 30. The display screens 86 can rotate from a stowed position (as shown in FIG. 2) to an extended position (as shown in FIG. 3). In the stowed position, the display screens are positioned parallel to the roof 30 and in the extended position, the display screens 86 project downward from the roof 30 at a right angle, or other suitable angle, for viewing by the occupant 26, occupant 28 or any other occupant in the seating row(s).

The various airbag assemblies of the airbag system 40 are nested with one another and surround the display screens 86. As will be described, this configuration of the airbag assemblies permits the airbag cushions to inflate to the inflated state without interfering with each other or with the display screens 86. As shown, the first airbag assembly 42 includes a first airbag cushion 46 with the occupant-facing portion 54, the first side portion 56 and the second side portion 58. The first airbag cushion 46 is fluidly connected to a first inflator 88. The first inflator 88 includes a solid propellant and/or a stored gas charge that can be used to inflate the first airbag cushion 46. In the example shown in FIG. 2, the first airbag cushion 46 is shown in the uninflated state. In the uninflated state, the first airbag cushion 46 is rolled, folded or otherwise packaged to be stowed in the roof 30. In some examples of the airbag system 40, the first airbag assembly 42 (or the other airbag assemblies that will be hereinafter described) can include an airbag housing (not shown) that can be used to enclose the airbag cushion 46. Such an airbag housing can include one or more movable doors and/or panels with break-away seams and/or living hinges that can open to permit the first airbag cushion 46 to inflate to the inflated state as shown in FIG. 3. The airbag housing(s) can also be made of a flexible but generally non-stretchable sleeve such as a fabric material that has a break-away seam.

Referring back to FIGS. 2 and 3, the occupant-facing portion 54 of the first airbag cushion 46 is positioned and fluidly connected between the first side portion 56 and the second side portion 58. This configuration creates a first gap 92 between the first side portion 56 and the second side portion 58. The first airbag cushion 46 is positioned on the roof 30 such that the display screens 86 are positioned in the first gap 92. With this configuration, the display screens 86 can be rotated from their stowed positions to their extended positions (and back) without interference by the first airbag cushion 46.

The second airbag assembly 44, in this example, is similarly configured to the first airbag assembly 42 but is positioned symmetrically opposite and laterally offset (i.e., offset in a cross-vehicle direction) from the first airbag assembly 42. The second airbag assembly 44 includes a second inflator 90. The second inflator 90 is fluidly connected to the second airbag cushion 48 and is configured to inflate the second airbag cushion 48. The second airbag cushion 48 includes the occupant-facing wall 60, the first side wall 62 and the second side wall 64. The occupant-facing wall 60 is connected to and in fluid communication with the first side wall 62 and the second side wall 64. The occupant-facing wall 60 is positioned between the first side wall 62 and the second side wall 64 to create a second gap 94. The second airbag cushion 48 is positioned on the roof 30 such that the display screens 86 are positioned inside the second gap 94.

The first airbag cushion 46 and the second airbag cushion 48 are nested inside one another such that at least a portion of the first gap 92 and the second gap 94 overlap with one another. In this manner, the display screens 86 are located inside the overlapping portion of the first gap 92 and the second gap 94. The first airbag cushion 46 and the second airbag cushion 48 are substantially the same size as one another but are laterally offset from one another. As shown, the first side wall 62 is positioned adjacent to the first side portion 56 and laterally outboard of the first side portion 56. The second side wall 64 is positioned adjacent to the second side portion 58 and laterally outboard of the second side portion 58. In this laterally offset and nested configuration, the first side portion 56 is located in the second gap 94 between the first side wall 62 and the second side wall 64. The second side wall 64 is located in the first gap 92 between the first side portion 56 and the second side portion 58.

Figure 4:
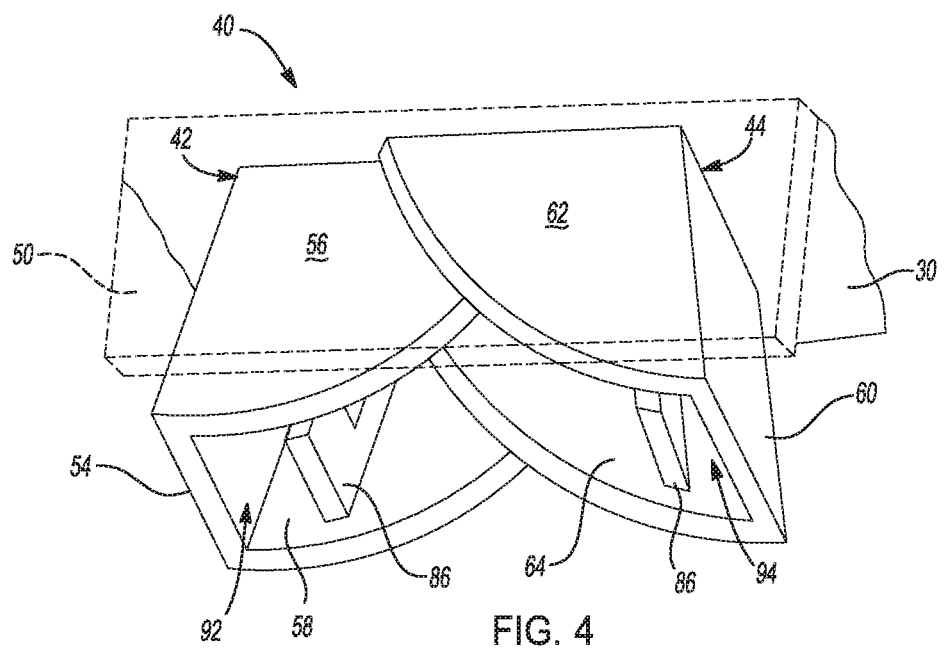
FIG. 4 is a view of the two example nested airbag assemblies shown in FIG. 2.

The first airbag cushion 46 and the second airbag cushion 48 can inflate to the inflated state (as shown in FIGS. 3 and 4) without interfering with each other or with the display screens 86. The first airbag cushion 46 and the second airbag cushion 48 are nested, in the example shown, so that the first side portion 56 and the first side wall 62 overlap one another along a horizontal plane defined by the roof 30. In the example shown, a distal end 96 of the first side portion 56 is located at or near the intersection of the first side wall 62 and the occupant-facing wall 60. Similarly, a distal end 98 of the first side wall 62 is located at or near the intersection of the first side portion 56 and the occupant-facing portion 54. A distal end 100 of the second side portion 58 and a distal end 102 of the second side wall 64 are similarly positioned at or near the intersection of the occupant-facing wall 60 and the second side wall 64 and the intersection of the occupant-facing portion 54 and the second side portion 58, respectively.

Figure 5:
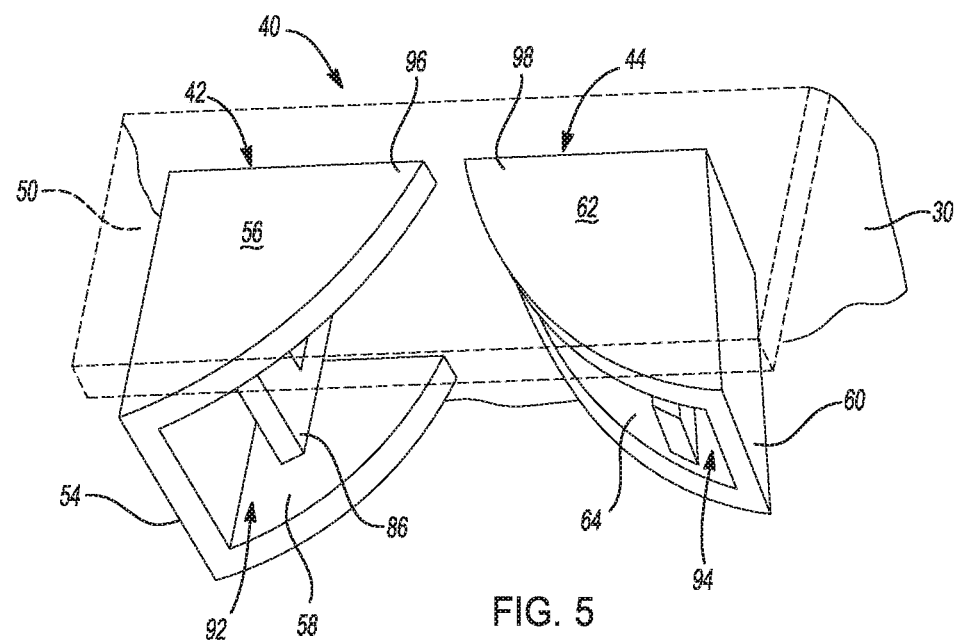
FIG. 5 is a view of two example partially nested airbag assemblies in accordance with the present disclosure.

In other examples, the first airbag cushion 46 and the second airbag cushion 48 can be nested inside one another to a lesser extent than the examples shown in FIGS. 3 and 4. In such other examples, the first side wall 62 and the first side portion 56 can have a smaller region in which the adjacent panels overlap or can be spaced with little or no overlap. In one example, as shown in FIG. 5, the first airbag cushion 46 and the second airbag cushion 48 are spaced apart from one another along the roof 30. In this example, the distal end 96 of the first side portion 56 is spaced apart from the distal end 98 of the first side wall 62 along the roof 30 in a direction orthogonal to the occupant-facing portion 54. In the example shown in FIG. 5, the first airbag cushion 46 and the second airbag cushion 48 are spaced apart from one another such that the first gap 92 and the second gap 94 do not overlap in a fore-aft direction. The first airbag cushion 46 and the second airbag cushion 48, however, perform similarly as previously described. The first airbag cushion 46 and the second airbag cushion 48 are positioned around the display screens 86 such that, in both the uninflated state and in the inflated state, the first airbag cushion 46 and the second airbag cushion 48 do not interfere with or are impeded by the display screens 86. In addition, the first side portion 56 and the second side portion 58 project away from the occupant-facing portion 54 to limit movement of the occupant-facing portion 54 in a direction away from the first occupant 26.

Referring back to FIGS. 2 and 3, the airbag system 40, in this example, includes the double occupant airbag assembly 80. The double-occupant airbag assembly 80 is similar in many respects to the first airbag assembly 42 and the second airbag assembly 44. The double-occupant airbag assembly 80 includes an inflator 104 that is connected to double-occupant airbag cushion 106. The double-occupant airbag cushion 106 includes a first side portion 108, a second side portion 110, a pair of occupant-facing portions 112 and a middle portion 114. The pair of occupant-facing portions 112 is connected between the first side portion 108 and the second side portion 110. The middle portion 114 is positioned between the pair of occupant-facing portions 112. The middle portion 114 projects away from the pair of occupant-facing portions 112. The middle portion 114 is spaced apart from the first side portion 108 to define a gap 116. The middle portion 114 is also spaced apart from the second side portion 110 to define a gap 118.

The double-occupant airbag cushion 106, in this example, is positioned on the roof 30 such that the display screens 86 are located inside the gaps 116, 118. In this manner, the double-occupant airbag cushion 106 can operate in the uninflated state (as shown if FIG. 2) and in the inflated state (as shown in FIG. 3) without interfering with, being impeded by or damaging the display screens 86.

The pair of occupant-facing portions 112 is disposed such that, when inflated, they are facing occupants that are seated in the vehicle 20. The first side portion 108, the second side portion 110 and the middle portion 114 are connected along the roof 30 and project away from the pair of occupant-facing portions 112. The first side portion 108, the second side portion 110 and the middle portion 114 support the pair of occupant-facing portions 112 and limit movement of the pair of occupant-facing portions 112 in a direction away from occupants when the occupants engage one or more of the pair of occupant-facing portions 112.

As further shown in the example of FIGS. 2 and 3, the airbag system 40 includes the continuous airbag assembly 82. The continuous airbag assembly 82 is nested inside the double-occupant airbag assembly 80. The continuous airbag assembly 82, in this example, includes an inflator 120 fluidly connected to a continuous airbag cushion 122. The continuous airbag cushion 122 includes a first side wall 124 and a second side wall 126. The continuous airbag cushion 122, in this example, has a single central chamber. As such, the continuous airbag cushion 122 does not have a gap between the first side wall 124 and the second side wall 126.

The continuous airbag cushion 122 is nested in the gap 116 between the first side portion 108 and the middle portion 114 of the double-occupant airbag cushion 106. The first side wall 124 is positioned adjacent to and laterally inboard of the first side portion 108. The second side wall 126 is positioned adjacent to and laterally inboard of the middle portion 114. The continuous airbag cushion 122 is spaced away from the occupant-facing portion 112 of the double-occupant airbag cushion 106 so as not to interfere with or be impeded by the display screen 86 located in the gap 116.

A continuous airbag cushion 122 is used in the example shown because a display screen 86 (or other vehicle structure) is not positioned at this location on the roof 30. As can be appreciated, in other examples of the airbag system 40, one or more continuous airbag cushions 122 can be used at other locations and in other variations of the airbag system 40.

Referring back to the example airbag system 40 shown in FIGS. 2 and 3, the third airbag assembly 84 includes a third airbag cushion 128 positioned in the gap 118 between the middle portion 114 and the second side portion 110. The third airbag assembly 84 is similar to the second airbag assembly 44 previously described. The third airbag assembly 84, however, is nested inside the gap 118 such that the first side wall 130 and the second side wall 132 are both located inside the gap 118 and between the middle portion 114 and the second side portion 110. The first side wall 130 is located adjacent to and laterally outboard of the middle portion 114. The second side wall 132 is located adjacent to and laterally inboard of the second side portion 110.

As shown and as referenced above, the airbag system 40 can be positioned between a first roof rail airbag assembly 50 and a second roof rail airbag assembly 134. In one example, the first roof rail airbag assembly 50 is positioned laterally outboard of the airbag system 40 along one side of the vehicle 20. In this position, the first roof rail airbag assembly 50 inflates and deploys downward between the occupants 26, 28 and a side wall (and/or side windows) of the vehicle 20. Similarly, the second roof rail airbag assembly 78 can be positioned laterally outboard of the airbag system 40 on an opposite side of the vehicle 20. The second roof rail airbag assembly 78 can be inflated and deployed downward between the occupants 26, 28 and the opposite side wall (and/or side windows) of the vehicle 20.

Figure 6:
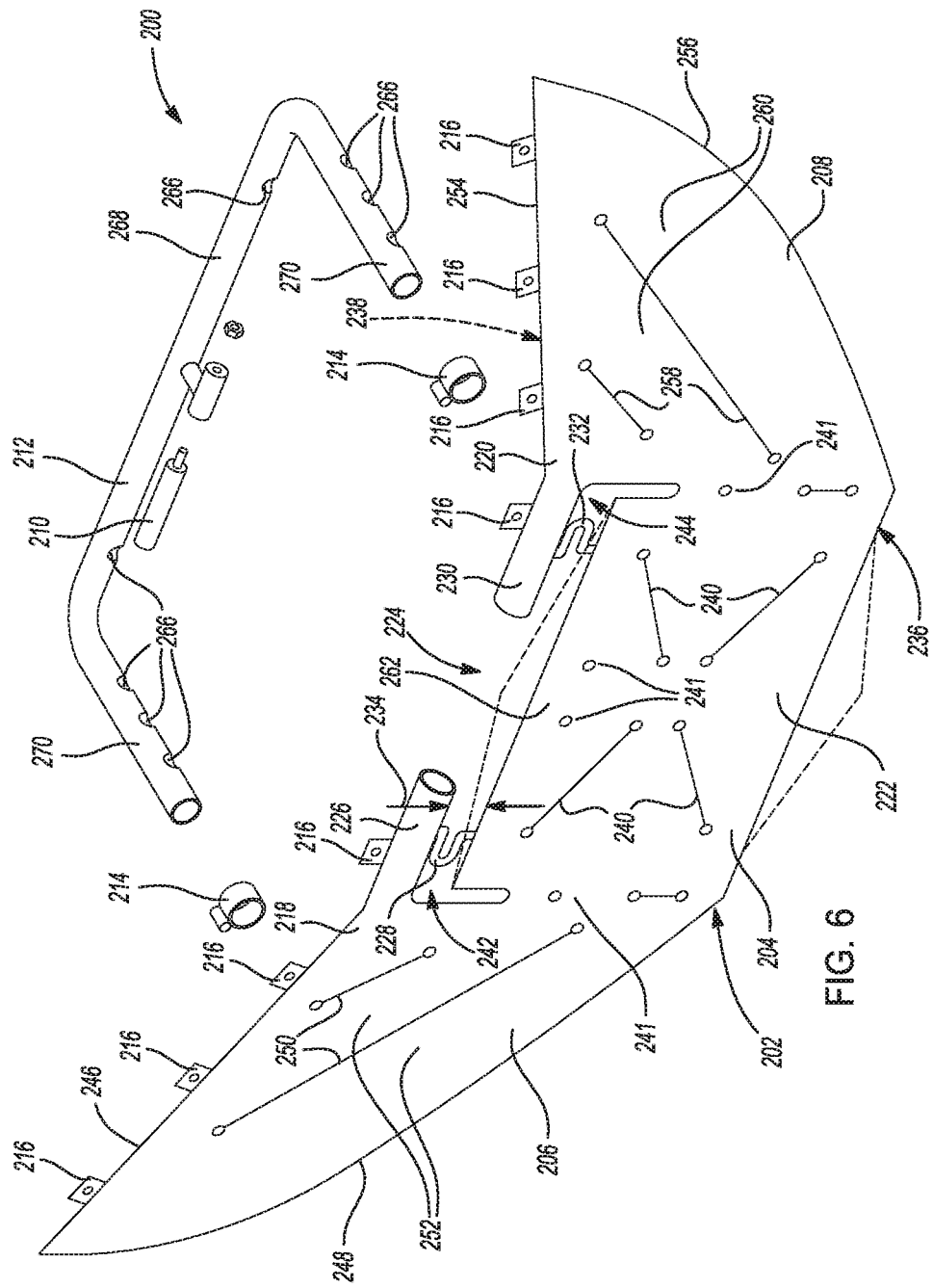
FIG. 6 is an exploded view of an example airbag assembly used in the airbag system of FIG. 2.
Figure 7:
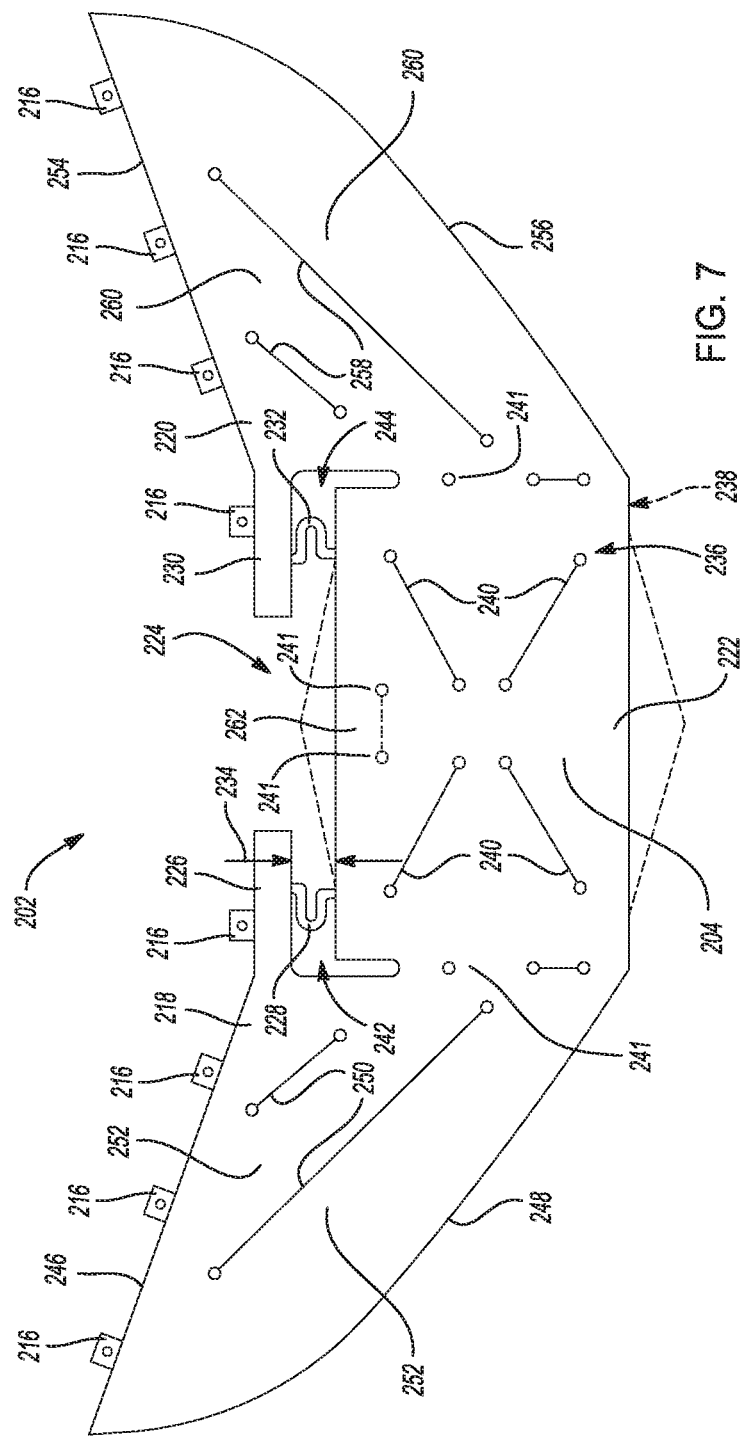
FIG. 7 is a view of an example airbag cushion used in the airbag assembly of FIG. 6.
Figure 8:
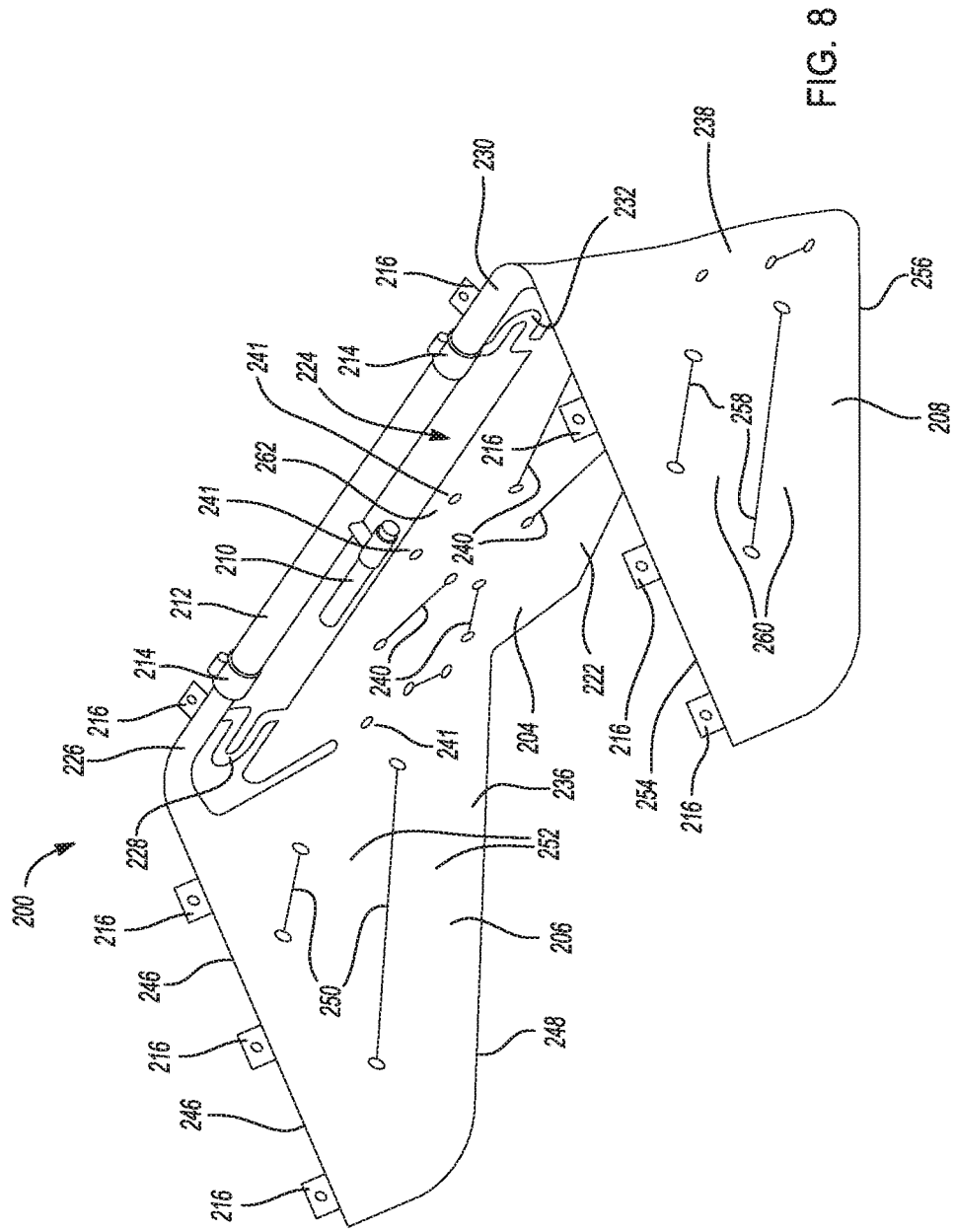
FIG. 8 is a view of the example airbag assembly of FIG. 6.

Referring now to FIGS. 6-8, an example airbag assembly 200 is shown. As can be appreciated, the first airbag assembly 42, the second airbag assembly 44, the third airbag assembly 84 and/or the double-occupant airbag assembly 80 may include all or some of the elements of the example airbag assembly 200. Variations and other combinations of the elements and principles hereinafter described can also be used.

As shown, the airbag assembly 200 includes an airbag cushion 202 with an occupant-facing portion 204, a first side portion 206 and a second side portion 208. The airbag assembly 200 also includes an inflator 210, a rigid fill tube 212, clamps 214 and a plurality of mounting tabs 216 that attach the airbag assembly 200 to a structural component of the vehicle 20. The airbag cushion 202 can be made from a flexible fabric material, such as a fabric fiber material construction, with limited expandability or stretchability when pressurized. This material can be coated with one or more gas impermeable layers or materials to reduce gas leakage through the fabric or seams.

The occupant-facing portion 204 is configured to be disposed in front of an occupant (such as the first or second occupant 26, 28) of the vehicle 20. The occupant-facing portion 204 includes a first side upper region 218, a second side upper region 220, and a lower region 222 disposed below the first and second upper regions 218 and 220. The first side upper region 218, the second side upper region 220, and the lower region 222 define a first opening 224 therebetween. The first opening 224 is configured to be directly in front of and above the occupant 26, 28. The first opening 224 may have a width (i.e., a minimum cross-vehicle or lateral dimension) that is approximately equal to the width of the first seat 22 or the second seat 24.

The first side upper region 218 includes a fabric fill tube 226 that provides fluid communication between the inflator 210 and the first side portion 206, and a tether 228 connecting the fabric fill tube 226 to the lower region 222. Similarly, the second side upper region 220 includes a fabric fill tube 230 that provides fluid communication between the inflator 210 and the second side portion 208, and a tether 232 connecting the fabric fill tube 230 to the lower region 222. In the example shown, the tether 228 is a fill tube that places the fabric fill tube 226 in fluid communication with the lower region 222, and the tether 232 is a fill tube that places the fabric fill tube 230 in fluid communication with the lower region 222. However, in various implementations, the tethers 228, 232 may be strips of uninflated fabric (e.g., single layer fabric strips) or the tethers 228, 232 may not be included.

The tether 228 has a first length extending from the fabric fill tube 226 to the occupant-facing portion 204. Similarly, the tether 232 has a second length extending from the fabric fill tube 230 to the occupant-facing portion 204. Each of the first and second lengths is greater than a distance 234 between the fabric fill tubes 226, 230 to the occupant-facing portion 204 which provides slack in the tethers 228, 232. This slack can be achieved by oversizing the tether length (i.e., making the first and second lengths greater than the distance 234), placing one or more bends in the tethers 228, 232, and/or laterally offsetting (i.e., offsetting in a cross-vehicle or lateral direction) the tether attachment points relative to one another. An example of this last option may include laterally offsetting an upper attachment point of the tether 228 relative to a lower attachment point of the tether 228 and laterally offsetting an upper attachment point of the tether 232 relative to a lower attachment point of the tether 232.

The lower region 222 includes an inner panel 236, an outer panel 238, and a one or more seams 240 joining the inner and outer panel portions 236 and 238 to one another. Each of the seams 240 is formed by stitching the inner and outer panel portions 236 and 238 to one another, by fibers of the inner and outer panel portions 236 and 238 woven together, and/or by a tether (e.g., a fabric strip) extending between and woven or otherwise attached to the inner and outer panel portions 236 and 238. If the seams 240 are formed by stitching or woven material, the inner and outer panel portions 236 and 238 may contact one another at the seams 240. In this regard, the stitching or woven material may be referred to as a zero-length tether since the length of the stitching or woven material extending between the inner and outer panel portions 236 and 238 at the seams 240 may be approximately zero.

In the example shown, the airbag cushion 202 includes four elongated seams 240 that are angled inward toward a center of the occupant-facing portion 204 and four round seams 241. The elongated seams 240 and the round seams 241 create localized regions of stiffness in the occupant-facing portion 204. The elongated seams 240 and the round seams 241 can also be used to cause the occupant-facing portion 204 to retain a desired shape and/or size when the airbag cushion 202 inflates.

The occupant-facing portion 204 and the first side portion 206 define a second opening 242 that separates the first side upper region 218 of the first side portion 206 from the upper portion of the occupant-facing portion 204. Similarly, the occupant-facing portion 204 and the second side portion 208 define a third opening 244 that separates the second side upper region 220 of the second side portion 208 from the upper portion of the occupant-facing portion 204.

Thus, the lower region 222 of the occupant-facing portion 204, the first side portion 206, and the second side portion 208 define an opening that is disposed above the lower region 222 and between the upper portion of the first side portion 206 and the lower region 222 and between the upper portion of the second side portion 208 and the lower region 222. In addition, the tethers 228, 232 divide this opening into the first, second and third openings 224, 242, and 244. Further, the occupant-facing portion 204 does not extend above a majority of the first opening 224.

The first side portion 206 is configured to be disposed on one side of a roof-mounted structure (e.g., the display screen 86, a console, a storage compartment, a control panel, etc.). The first side portion 206 is in fluid communication with the occupant-facing portion 204 through the fabric fill tube 226 of the occupant-facing portion 204 and through the attachment with the lower region 222 of the occupant-facing portion 204. The first side portion 206 has an upper horizontal edge 246 and a lower angled (or rounded) edge 248. In other examples, the edges 246 and 248 can have other shapes or profiles. The first side portion 206 includes an inner panel and an outer panel that define a chamber therein.

The first side portion 206 also includes a plurality of seams 250 joining the inner and outer panels to one another and defining a plurality of elongated inflated regions 252. Each of the elongated inflated regions 252 has a tubular shape. The seams 250 and the elongated inflated regions 252 are oriented at a nonzero oblique angle with respect to each of the upper horizontal edge 246. The seams 250 are angled upwardly as they extend away from the occupant-facing portion 204. In the example shown, each of the seams 250 and the elongated inflated regions 252 is oriented at an angle between 15 degrees and 60 degrees (e.g., 30 degrees) with respect to the upper horizontal edge 246.

Each of the seams 250 is formed by stitching the inner and outer panels of the first side portion 206 to one another, by fibers of the inner and outer panels woven together, and/or by a tether (e.g., a fabric strip) extending between and woven or otherwise attached to the inner and outer panels of the first side portion 206. If the seams 250 are formed by stitching or woven material, the inner and outer panels may contact one another at the seams 250. In this regard, the stitching or woven material may be referred to as a zero-length tether since the length of the stitching or woven material extending between the inner and outer panels at the seams 250 may be approximately zero.

Referring still to FIGS. 6-8, the second side portion 208 is configured to be disposed on the side of the occupant-facing portion 204 opposite to the first side portion 206. The second side portion 208 is in fluid communication with the occupant-facing portion 204 through the fabric fill tube 230 of the occupant-facing portion 204 and through the attachment with the lower region 222 of the occupant-facing portion 204. The second side portion 208 has an upper horizontal edge 254, a lower edge 256. The second side portion 208 includes an inner panel and an outer panel and a plurality of seams 258 joining the inner and outer panels of the second side portion 208 to one another and defining a plurality of elongated inflated regions 260. Each of the elongated inflated regions 260 has a tubular shape. The seams 258 and the elongated inflated regions 260 are oriented at a nonzero oblique angle with respect to each of the upper horizontal edge 254. In the example shown, each of the seams 258 and the elongated inflated regions 260 is oriented at an angle between 15 degrees and 60 degrees (e.g., 30 degrees) with respect to the upper horizontal edge 254.

The angle of the seams 250, 258 and the elongated inflated regions 252, 260 supports the lower region 222 of the occupant-facing portion 204. This configuration permits forces that are imparted to the occupant-facing portion 204 to be transmitted upwardly toward the roof 30 where the first side portion 206 and the second side portion 208 are secured. The first opening 224 in the occupant-facing portion 204 reduces the stiffness of the connection between the fabric fill tubes 226, 230 and the lower region 222 of the occupant-facing portion 204. Similarly, the second and third openings 242 and 244 reduce the stiffness of the connections between the occupant-facing portion 204 and the first and second side portions 206, 208, respectively. Thus, the first, second, and third openings 224, 242 and 244 allow a flexing portion 262 of the occupant-facing portion 204 to rotate away in a controlled fashion based on cushion pressure and stiffness from an occupant of the vehicle. In addition, the slack in the tethers 228, 232 allow the flexing portion 262 of the lower region 222 of the occupant-facing portion 204 to rotate further in the direction away from the occupant than would be possible without the slack in the tethers 228, 232. Further, the first, second, and third openings 224, 242 and 244 and the slack in the tethers 228, 232 allow the lower region 222 of the occupant-facing portion 204 to move in a direction (but to a lesser extent) as the flexing portion 262.

Since the flexing portion 262 of the occupant-facing portion 204 is not directly attached to the first and second side portions 206 and 208, the flexing portion 262 can rotate when a head of the occupant 26, 28 contacts the flexing portion 262. The lower region 222 can also move if a head or torso of the occupant contacts the lower region 222 since this portion of the airbag cushion 202 is further away from the roof mounting location and experiences a higher bending moment from an applied force than a portion located closer to the roof mounting location (i.e., above) the lower region 222. This configuration reduces the forces and moment on a neck of the occupant 26, 28 no matter where a head of the occupant 26, 28 contacts the airbag cushion 202.

Referring again to FIGS. 6-8, the inflator 210 is configured to inflate the occupant-facing portion 204, the first side portion 206 and the second side portion 208. The inflator 210 sends gas to the occupant-facing portion 204, the first side portion 206 and the second side portion 208. The inflator 210 includes a cylindrical body having a closed end and an open end that is configured to connect to the rigid fill tube 212. In the example shown, the inflator 210 is connected to the rigid fill tube 212 using a threaded joint (not shown). In other examples, other suitable mechanical connections can be used.

The inflator 210 may be a pyrotechnic inflator, a stored gas inflator, or a hybrid inflator. In all cases, the cylindrical body of the inflator 210 may house an electric igniter and an explosive charge such as a solid propellant. The electric igniter ignites the solid propellant in response to an electronic control signal, which produces a gas that inflates the cushion portions of the airbag assembly 200. If the inflator 210 is a hybrid inflator or a stored gas inflator, the cylindrical body of the inflator 210 may also contain cold pressurized gas that cooperates with the gas released from combustion of the solid propellant to inflate the cushion portions of the airbag assembly 200.

The rigid fill tube 212 delivers gas from the inflator 210 to the occupant-facing portion 204, the first side portion 206 and the second side portion 208. The rigid fill tube 212 extends into the fabric fill tubes 226, 230 of the occupant-facing portion 204. The fabric fill tubes 226, 230 of the occupant-facing portion 204 may be held onto the rigid fill tube 212 using multiple clamps 214. The rigid fill tube 212 can be made from a metal such as steel and can have one or more holes 266 (FIG. 6) for distributing gas to the cushion portions of the airbag assembly 200.

As shown in FIG. 6, the rigid fill tube 212 may include a first straight segment 268 and a pair of legs 270. The first straight segment 268 extends through the fabric fill tubes 226, 230 of the occupant-facing portion 204. The rigid fill tube 212 then bends and the pair of legs 270 extends into each of the first and second side portions 206, 208. In the example shown, the first straight segment 268 and the pair of legs 270 are positioned at right angles to each other. In other examples, the legs 270 can be oriented at an oblique angle relative to the straight segment 268.

In the example shown, the rigid fill tube 212 extends through the occupant-facing portion 204, the first side portion 206 and the second side portion 208. During assembly, the fabric fill tubes 226, 230 are first slid over the legs 270 and then the first straight segment 268. The clamps 214 may be slid onto the rigid fill tube 212 before the fabric fill tubes 226, 230 and then placed over the fabric fill tubes 226, 230 after the rigid fill tube 212 is positioned within the fabric fill tubes 226, 230. The clamps 214 may then be tightened to hold the fabric fill tubes 226, 230 in position on the first straight segment 268 of the rigid fill tube 212 as shown in FIG. 8.

In various implementations, the rigid fill tube 212 may not be as long as shown in FIG. 6 and thus may not extend through the occupant-facing portion 204, the first side portion 206 and the second side portion 208. Additionally or alternatively, the rigid fill tube 212 may extend only partially through the occupant-facing portion 204, the first side portion 206 and/or the second side portion 208. For example, the rigid fill tube 212 may extend through the fabric fill tubes 226, 230 of the occupant-facing portion 204 and partially through the first and second side portions 206, 208 to a midpoint along the length (i.e. fore-aft dimension) thereof.

As yet another alternative, the inflator 210 may be located at a different position than the center of the occupant-facing portion 204. For example, the inflator 210 could be located on the left or right side of the occupant-facing portion 204, or on the first or second side portion 206, 208. In addition, two inflators 210 could be used with, for example, one of the inflators 210 attached to the first side portion 206 and one of the inflators 210 attached to the second side portion 208. This two-inflator configuration would avoid the need for the rigid fill tube 212 to laterally span the occupant-facing portion 204, and would enable omitting the first and second side upper regions 218, 220 from the occupant-facing portion 204.

The mounting tabs 216 can be made from a flexible fabric material and can be formed integrally with the cushion portions of the airbag assembly 200 or formed separate from and attached to the cushion portions of the airbag assembly 200. Each of the mounting tabs 216 has a rectangular shape and includes a hole configured to receive a fastener for mounting the airbag assembly 200 to a roof of the vehicle. In the example shown in FIGS. 6-8, the airbag assembly 200 includes two of the mounting tabs 216 on the occupant-facing portion 204 and three mounting tabs on each of the first and second side portions 206 and 208. In other examples, the number of the mounting tabs 216 included in the airbag assembly 200 may be less than or greater than the number shown in FIGS. 6-8 and/or the mounting tabs 216 may be positioned differently than shown in FIGS. 6-8.

Figure 9:
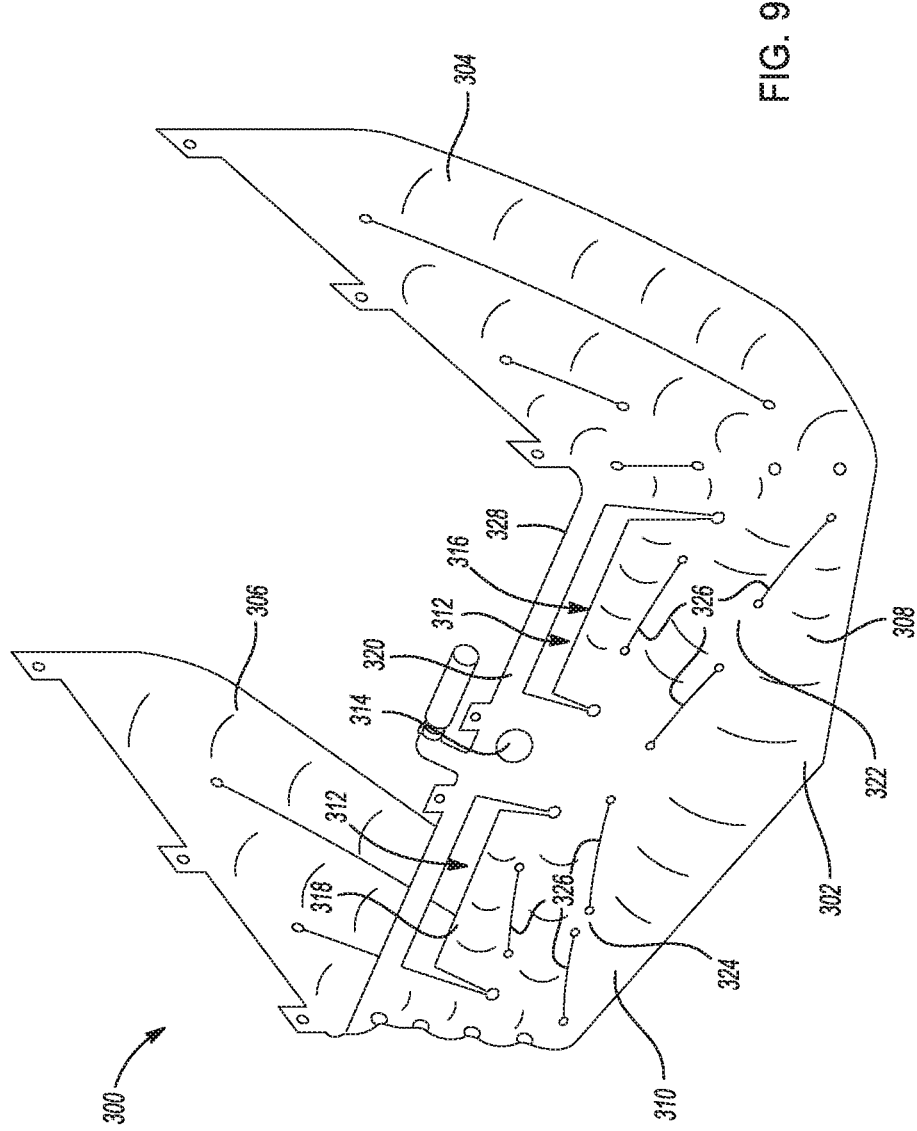
FIG. 9 is an illustration of an example airbag cushion with two occupant-facing portions.

Referring now to FIG. 9, an airbag assembly 300 is similar to the airbag assembly 200 except that the airbag assembly 300 is configured with a double-occupant cushion 302. The double-occupant cushion 302 is positioned between a first side portion 304 and a second side portion 306. The double-occupant cushion 302 is configured for positioning in front of two occupants seated laterally next to each other. In this regard, the airbag assembly 300 may have a width (i.e., a cross-vehicle or lateral overall dimension) that is approximately twice the width of the airbag assembly 200. As can be seen, the double-occupant cushion 302 includes a first occupant-facing portion 308 and a second occupant-facing portion 310. In addition, the airbag assembly 300 defines a pair of openings 312. Each of the openings 312 has a generally inverted "U" shape with a rectangular shaped opening at the top, and each of the openings 312 may have a width accommodates the approximate width of a seat and/or an occupant.

The double-occupant airbag cushion 302 further defines an unfilled region 314, which can be an opening, located at the center 342 between the first occupant-facing portion 308 and the second occupant-facing portion 310. The unfilled region 314 has a circular shape. The first and second occupant-facing portions 308 and 310 each also include a first flexing portion 316 and a second flexing portion 318, respectively. While not shown, the double-occupant airbag cushion 302 can also include a first and second pair of tethers (similar to the tethers 228, 230 previously described) that connect the first flexing portion 316 to the second flexing portion 318 to the fabric fill tube 320.

The first occupant-facing portion 308 and the second occupant-facing portion 310 also include, in this example, a first lower region 322 and a second lower region 324, respectively. The first lower region 322 and the second lower region 324 are located below the first flexing portion 316 and the second flexing portion 318, respectively.

As shown, the first occupant-facing portion 308 and the second occupant-facing portion 310 include a plurality of seams 326. The first occupant-facing portion 308 and the second occupant-facing portion 310 each include an inner panel and an outer panel that define a chamber therein. The plurality of seams 326 joins the inner and outer panels to one another. The seams 326 are oriented at an oblique angle with respect to an upper horizontal edge 328. The seams 326, in this example, separate the first and second occupant-facing portions 308 and 310 into elongated tubular regions that span transversely in the vehicle. As can be appreciated, the seams 326 can be positioned to cause or bias the first and second occupant-facing portions 308 and 310 to rotate or bend at a desired location. For example, the lower edge of the occupant-facing portions 308, 310 and the seams 326 define an inflated diamond shaped region that is stiffer in the middle of the diamond shaped region than at the edges of the diamond shaped region. This inflated geometry can prevent (or limit) the airbag cushion 302 from easily bending in the middle. A similar geometry and/or structure as that described above can be used to extend the airbag cushion 302 laterally to add additional occupant facing positions. In one example (not shown), the airbag cushion 302 is extended laterally to add a third occupant-facing portion and a third flexing portion that can be used in vehicle environments to accommodate a seating environment with three occupants seated laterally adjacent to one another.

Each of the seams 326 is formed by stitching the inner and outer panels of the first occupant-facing portion 308 or the second occupant-facing portion 310 to one another, by fibers of the inner and outer panels woven together, and/or by a tether (e.g., a fabric strip) extending between and woven or otherwise attached to the inner and outer panels of the first occupant-facing portion 308 or the second occupant-facing portion 310. If the seams 326 are formed by stitching or woven material, the inner and outer panels may contact one another at the seams 326. In this regard, the stitching or woven material may be referred to as a zero-length tether since the length of the stitching or woven material extending between the inner and outer panels at the seams 326 may be approximately zero.

Figure 10:
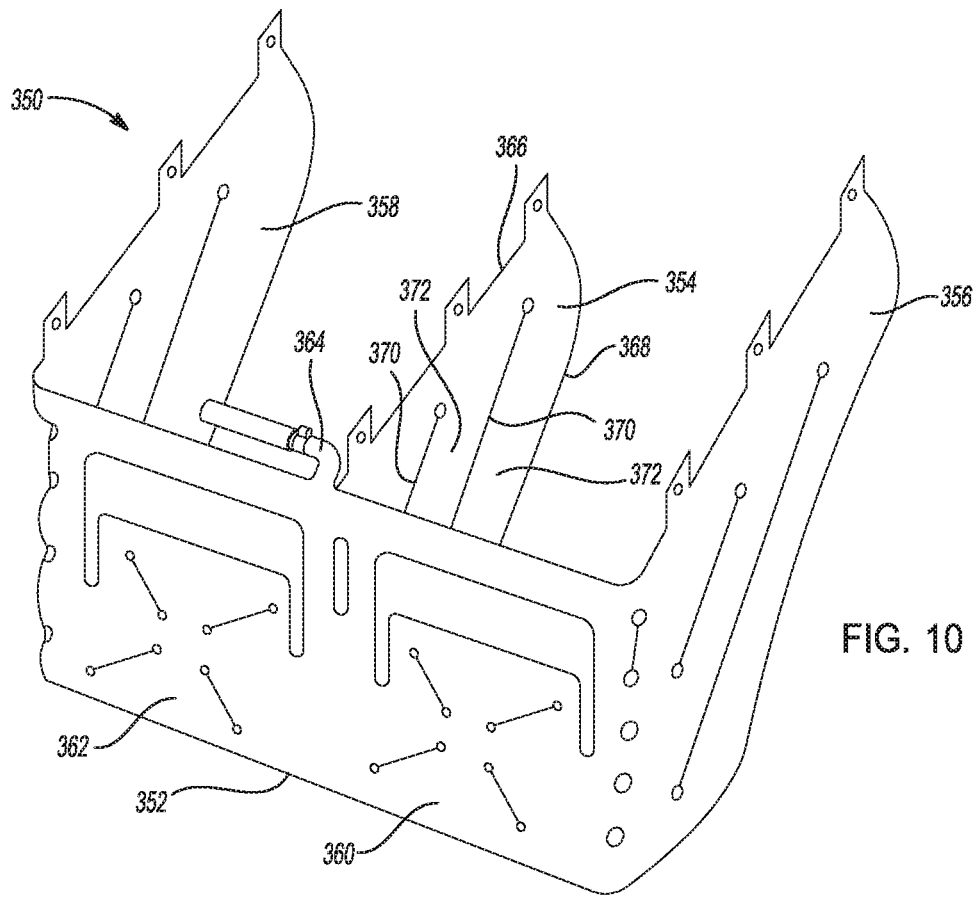
FIG. 10 is an illustration of another example airbag cushion with two occupant-facing portions.

Another example airbag assembly 350 is shown in FIG. 10. This example airbag assembly 350 includes a double-occupant airbag cushion 352 similar to that previously described with respect to example airbag assembly 300. In this example, however, the airbag assembly 350 includes a middle portion 354. The middle portion 354 is similar to that previously described. The middle portion 354 is positioned between the first side portion 356 and the second side portion 358 and is configured to support the double-occupant airbag cushion 352 between a first occupant-facing portion 360 and a second occupant-facing portion 362.

The middle portion 354 is in fluid communication with the first occupant-facing portion 360 and a second occupant-facing portion 362 through a fabric fill tube 364 and/or through the attachment with the lower regions of the first occupant-facing portion 360 and a second occupant-facing portion 362. The middle portion 354 has an upper horizontal edge 366 and a lower angled (or rounded) edge 368. In other examples, the edges 366 and 368 can have other shapes or profiles. The middle portion 354 includes an inner panel and an outer panel that define a chamber therein. The middle portion 354 also includes a plurality of seams 370 joining the inner and outer panels to one another and defining a plurality of elongated inflated regions 372. Each of the elongated inflated regions 372 has a tubular shape. The seams 370 and the elongated inflated regions 372 are oriented at a nonzero oblique angle with respect to each of the upper horizontal edge 366. In the example shown, each of the seams 370 is oriented at an angle between 15 degrees and 60 degrees (e.g., 30 degrees) with respect to the upper horizontal edge 366. The seams 370 are angled upwardly as they extend away from the first and second occupant-facing portions 360 and 362.

Each of the seams 370 is formed by stitching the inner and outer panels of the middle portion 354 to one another, by fibers of the inner and outer panels woven together, and/or by a tether (e.g., a fabric strip) extending between and woven or otherwise attached to the inner and outer panels of the middle portion 354. If the seams 370 are formed by stitching or woven material, the inner and outer panels may contact one another at the seams 370. In this regard, the stitching or woven material may be referred to as a zero-length tether since the length of the stitching or woven material extending between the inner and outer panels at the seams 370 may be approximately zero.

While not shown in FIGS. 9 and 10, the airbag assemblies 300, 350 can include a rigid fill tube similar to the rigid fill tube 212. The rigid fill tube can be attached to or inserted into or sewn inside the double-occupant cushions 302, 352 as previously described with respect to airbag assembly 200.

Referring now to FIGS. 11A, 11B, and 11C, variations of the occupant-facing portion are shown. These variations can be used in any of the foregoing example airbag assemblies. As discussed above with respect to the example airbag cushion 202, the seams 240 of the occupant-facing portion 204 join the inner and outer panels to one another. In FIGS. 11A and B, the occupant-facing portion 204 further includes a panel 380 attached (e.g., sewn) to an upper edge 382 of the occupant-facing portion 204 and a lower edge 384 of the occupant-facing portion 204. The panel 380 extends over an upper lobe 386 and a lower lobe 388 to provide a flat surface that faces the occupant 26, 28. As shown in FIG. 11B, the panel 380 can be connected over an occupant-facing portion 204 that has been shaped to have the upper lobe 386, the lower lobe 388 and a middle lobe 394.

Referring now to FIG. 11C, another variation of the occupant-facing portion 204 is shown. In FIG. 11C, the occupant-facing portion 204 further includes tethers 390 disposed within each of the upper and lower portions (or lobes) 386 and 388. The tethers 390 join the inner and outer panel to one another and create the cup features 392. The tethers 390 may be woven into or sewn to the occupant-facing portion 204. Other types, shapes and configurations of the tethers 390 can also be used to shape the occupant-facing portion 204 as desired. In addition, the sides of the occupant-facing portion 204 can be oriented such that one cup feature 392 is oriented away from the occupant and two cup features 392 are oriented toward the occupant.

Figure 12:
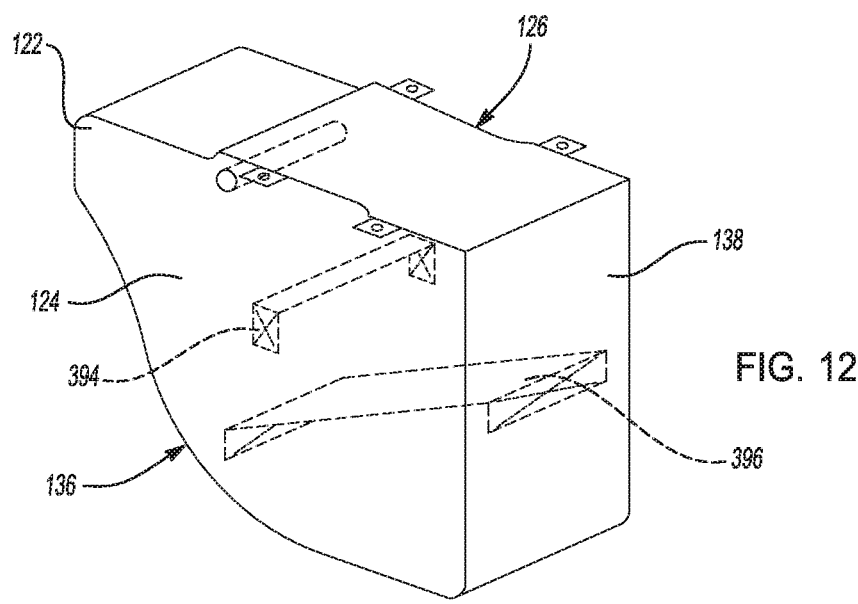
FIG. 12 is an illustration of an example continuous airbag cushion used in the airbag system of FIG. 2.

As shown in FIG. 12, the example continuous airbag cushion 122 is shown. The continuous airbag cushion 122 can be used, for example, in the third airbag assembly shown in FIGS. 2 and 3. As shown, the continuous airbag cushion 122 can include one or more lateral tethers 394 and/or one or more restricting tethers 396. The lateral tether 394, in this example, is connected between the first side wall 124 and the second side wall 126 inside the continuous airbag cushion 122. The restricting tether 396, in this example, is connected to the occupant-facing wall 138 and to a back wall 136. The restricting tether 396 can limit the back wall 136 from interfering with another airbag assembly that may be positioned in proximity to the continuous airbag cushion 122 or can prevent the back wall 136 from interfering with a display screen 86 that may be mounted in proximity to the continuous airbag cushion 122. The restricting tether 396 can also help to shape the occupant-facing wall 138. In other examples, the continuous airbag cushion 122 can include other tethers in other shapes and in other configurations to limit the size shape and inflation of the continuous airbag cushion 122. The lateral tether 394 and the restricting tether 396 can be sewn or woven into the occupant-facing wall 138, the back wall 136, the first side wall 124 and/or the second side wall 126.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An overhead airbag system comprising:
    a first airbag assembly including a first inflator and a first airbag cushion, the first airbag cushion including an occupant-facing portion, a first side portion and a second side portion, the occupant-facing portion connected between the first side portion and the second side portion and separating the first side portion from the second side portion by a first gap, the first airbag cushion fluidly connected to the first inflator and operable in an uninflated state and an inflated state; and
    a second airbag assembly including a second inflator and a second airbag cushion, the second airbag cushion including an occupant-facing wall and at least one side wall, the occupant-facing wall facing away from the occupant-facing portion of the first airbag cushion and the at least one side wall positioned between the first side portion and the second side portion of the first airbag cushion, wherein the at least one side wall of the second airbag cushion includes a first side wall and a second side wall, the occupant-facing wall positioned between the first side wall and the second side wall and separating the first side wall from the second side wall by a second gap, the second airbag cushion fluidly connected to the second inflator and operable in an uninflated state and an inflated state.

2. The overhead airbag system of claim 1 wherein the first side wall is positioned adjacent to the first side portion, the second side wall is positioned adjacent to the second side portion and between the first side portion and the second side portion.

3. The overhead airbag system of claim 2 configured for use in a vehicle with a roof-mounted structure wherein at least a portion of the first gap and at least a portion of the second gap overlap such that the roof-mounted structure is located between the first side wall and the second side wall when the second airbag cushion is in the inflated state.

4. The overhead airbag system of claim 3 wherein the first airbag cushion and the second airbag cushion can be inflated from the uninflated state to the inflated state independently of each other.

5. The overhead airbag system of claim 3 wherein the first airbag cushion and the second airbag cushion are configured to inflate from the uninflated state to the inflated state independently without interfering with the roof-mounted structure.

6. The overhead airbag system of claim 1 configured for use in a vehicle wherein the first side portion and the second side portion project away from the occupant-facing portion along a roof of the vehicle, and wherein the first side portion and the second side portion are configured to support the occupant-facing portion and limit movement of the occupant-facing portion in a direction away from an occupant of the vehicle when the occupant engages the first airbag cushion.

7. The overhead airbag system of claim 1 wherein the first side portion includes a plurality of seams disposed in an upward diagonal direction from the occupant-facing portion toward a distal end of the first side portion, the plurality of seams configured to stiffen the first side portion to support the occupant-facing portion and limit movement thereof when an occupant engages the first airbag cushion.

8. The overhead airbag system of claim 1 wherein the first airbag assembly includes a second occupant-facing portion disposed laterally adjacent to the occupant-facing portion, the occupant-facing portion configured to be located in front of a first occupant in a vehicle and the second occupant-facing portion configured to be located in front of a second occupant in the vehicle, the first occupant being seated adjacent to the second occupant.

9. An overhead airbag system comprising:
a first airbag assembly including a first inflator and a first airbag cushion, the first airbag cushion including an occupant-facing portion, a first side portion and a second side portion, the occupant-facing portion connected between the first side portion and the second side portion and separating the first side portion from the second side portion by a first gap, the first airbag cushion fluidly connected to the first inflator and operable in an uninflated state and an inflated state; and
a second airbag assembly including a second inflator and a second airbag cushion, the second airbag cushion including an occupant-facing wall and at least one side wall, the occupant-facing wall facing away from the occupant-facing portion of the first airbag cushion and the at least one side wall positioned between the first side portion and the second side portion of the first airbag cushion, wherein:
the occupant-facing portion of the first airbag cushion is disposed opposite to the occupant-facing wall of the second airbag cushion; and
the occupant-facing portion of the first airbag cushion and the occupant-facing wall of the second airbag cushion are configured to inflate in directions away from each other and toward occupants that are facing toward each other.

10. An overhead airbag system for use in a vehicle with a roof-mounted structure, the airbag system comprising:
a first airbag assembly including a first inflator and a first airbag cushion, the first airbag cushion including an occupant-facing portion, a first side portion and a second side portion, the occupant-facing portion being connected between the first side portion and the second side portion and separating the first side portion from the second side portion by a first gap, the first airbag cushion fluidly connected to the first inflator and operable in an uninflated state and an inflated state, wherein:
the first airbag cushion inflates from the uninflated state to the inflated state such that the roof-mounted structure is positioned in the first gap when the first airbag cushion is in the inflated state;
the occupant-facing portion is configured to face in a first direction toward an occupant of the vehicle;
the first side portion and the second side portion are configured to project from the occupant-facing portion along a roof of the vehicle in a second direction away from the occupant and opposite of the first direction; and
the first side portion and the second side portion are configured to support the occupant-facing portion and limit movement of the occupant-facing portion in the second direction, wherein the first airbag cushion further includes a middle portion and a second occupant-facing portion, the middle portion being connected to the occupant-facing portion and disposed between the first side portion and the second side portion.

\* \* \* \* \*